United States Patent
Elenes et al.

(10) Patent No.: US 9,584,347 B2
(45) Date of Patent: Feb. 28, 2017

(54) METHODS AND SYSTEMS FOR RAPID DETECTION OF DIGITAL RADIO SIGNALS

(71) Applicant: Silicon Laboratories Inc., Austin, TX (US)

(72) Inventors: Javier Elenes, Austin, TX (US); Dana Taipale, Austin, TX (US)

(73) Assignee: Silicon Laboratories Inc., Austin, TX (US)

(*) Notice: Subject to any disclaimer, the term of this patent is extended or adjusted under 35 U.S.C. 154(b) by 100 days.

(21) Appl. No.: 13/906,465

(22) Filed: May 31, 2013

(65) Prior Publication Data

US 2014/0355726 A1 Dec. 4, 2014

(51) Int. Cl.
*H04L 27/26* (2006.01)
*H04L 25/03* (2006.01)

(52) U.S. Cl.
CPC .... *H04L 25/03834* (2013.01); *H04L 27/2605* (2013.01); *H04L 27/2649* (2013.01)

(58) Field of Classification Search
CPC ... H04B 1/08; H04B 1/10; H04B 1/16; H04B 1/18; H04B 7/00; H04B 7/02; H04B 7/08; H04H 20/71; H04H 60/12; H04L 1/00; H04L 25/03; H04L 27/00; H04L 27/06; H04L 27/08; H04L 27/28; H04L 25/03834; H04L 27/26; H04L 27/2605; H04L 27/2649; H04W 4/00; H04W 4/06; H04W 88/02
USPC ........ 370/312, 334; 375/224, 229, 259, 267, 375/340, 342, 343, 346, 350; 386/123; 455/3.02, 45, 130, 132, 160.1, 337; 708/304
See application file for complete search history.

(56) References Cited

U.S. PATENT DOCUMENTS

| | | | |
|---|---|---|---|
| 7,339,503 B1 | 3/2008 | Elenes | |
| 7,483,501 B1 | 1/2009 | Michaels, Jr. | |
| 7,555,065 B1 | 6/2009 | Lou et al. | |
| 8,224,254 B2 | 7/2012 | Haykin | |
| 2002/0172270 A1 | 11/2002 | Whikehart et al. | |
| 2007/0230403 A1* | 10/2007 | Douglas et al. | 370/334 |
| 2007/0291876 A1* | 12/2007 | Shridhar et al. | 375/316 |
| 2008/0267590 A1* | 10/2008 | Otsuka | 386/123 |
| 2008/0298515 A1 | 12/2008 | Peyla et al. | |

(Continued)

*Primary Examiner* — Shawkat M Ali
(74) *Attorney, Agent, or Firm* — Egan, Peterman, Enders & Huston LLP

(57) ABSTRACT

Systems and methods are disclosed for rapid detection of digital content within received radio frequency (RF) signals. The disclosed embodiments digitize received RF signals and apply a sliding window average to subsampled complex magnitudes for the digital samples to generate subsampled magnitude values. The subsampled magnitude values are then collected over a small number of symbols for the digital content, and the results are analyzed to determine whether or not digital content is present with the received signals. For example, multi-symbol histograms and magnitude ratios determined over multiple symbols can then be utilized to make the determination of whether digital content is present in the received signals. The resulting detection determination can be utilized further to control operations of systems utilizing the disclosed embodiments. The disclosed embodiments can be used, for example, to detect the presence of HD (High Definition) Radio digital content within broadcast channels.

32 Claims, 9 Drawing Sheets

(56) References Cited

U.S. PATENT DOCUMENTS

| | | |
|---|---|---|
| 2011/0039492 A1 | 2/2011 | Johnson et al. |
| 2011/0069776 A1* | 3/2011 | Huang et al. ................ 375/267 |
| 2012/0028567 A1 | 2/2012 | Marko |
| 2012/0082271 A1 | 4/2012 | Elenes et al. |
| 2012/0108191 A1 | 5/2012 | Henson |

* cited by examiner

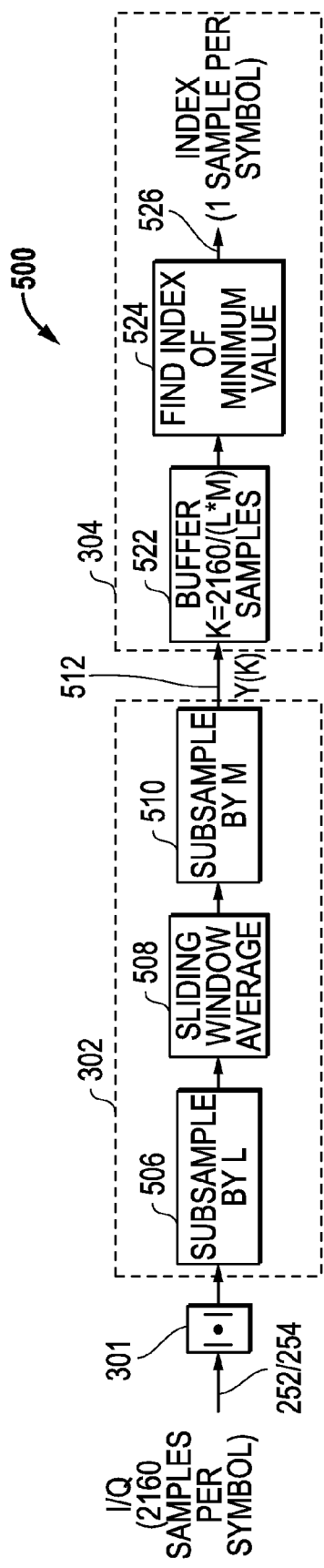
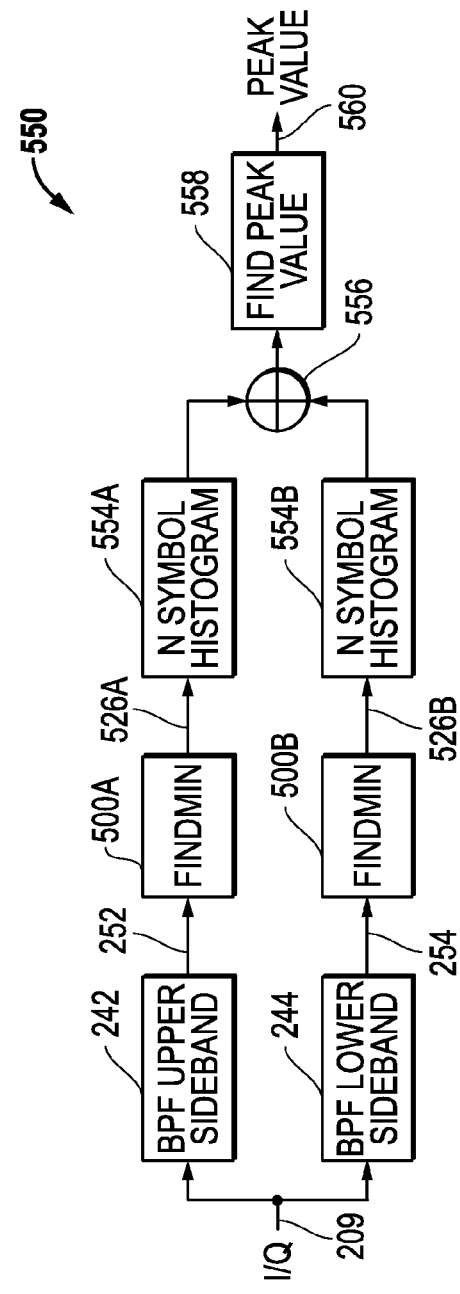
FIG. 5A
FIG. 5B

METHODS AND SYSTEMS FOR RAPID DETECTION OF DIGITAL RADIO SIGNALS

TECHNICAL FIELD OF THE INVENTION

This invention relates to the detection of digital radio signals within broadcast channels and, more particularly, to detection of HD (High Definition) Radio signals within AM/FM broadcast channels.

BACKGROUND

Within the United States, FM audio broadcast channels are broadcast in 200 kHz wide channels in a frequency band from 88 MHz to 108 MHz, and AM audio broadcast channels are broadcast in 10 kHz wide channels in a frequency band from 540 kHz to 1710 kHz. Certain radio broadcasts include digital content along with analog content, for example, as part the broadcast channels used for AM or FM audio broadcasts. Protocols for HD (High Definition) Radio in the United States were developed by iBiquity Digital Corporation. In particular, for HD Radio, digital content is broadcast in upper and lower sidebands related to a center frequency for a primary analog AM or FM broadcast channel.

FIG. 1A (Prior Art) is a signal diagram for an FM audio broadcast channel 100 that includes HD Radio digital content. This HD digital content is transmitted as OFDM (orthogonal frequency division multiplexed) signals within sidebands 104 and 106 on either side of the analog FM signal 102, which is centered on the center frequency ($f_C$) for the FM channel. Sidebands 104 and 106 each include ten frequency partitions. As depicted, digital sideband 104 is located within a lower sideband frequency range ($f_{L1}$ to $f_{H1}$), and digital sideband 106 is located within an upper sideband frequency range ($f_{L2}$ to $f_{H2}$). The HD Radio spectrum for AM broadcast channels is similarly configured with the HD digital content being in sidebands on either side of the analog AM signal centered within the AM broadcast channel. It is noted that the HD digital content in the upper and lower sidebands 104 and 106 duplicate each and other, and the HD digital content also typically duplicates the analog content within the broadcast channel. The HD digital content can also include content in addition to what is broadcast within the analog content. For example, the HD digital content may include one or more digital-only programs in addition to the digital content that duplicates the content on the analog channel. It is also noted that OFDM signals for HD digital content can be transmitted in an all digital mode such that the analog signal is replaced with the OFDM signals. As such, only HD digital content is transmitted within the channel.

FIG. 1B (Prior Art) is a signal diagram for a pulse shaping function 150 used for shaping OFDM (Orthogonal Frequency Division Multiplex) symbols used for HD Radio broadcasts. OFDM is a modulation technique that encodes digital data on a number of closely spaced orthogonal sub-carrier signals, and OFDM is used for transmitting digital content within the upper and lower sidebands 104 and 106 for the HD Radio broadcast spectrum 100 as shown in FIG. 1A (Prior Art). Each of the ten sub-carriers in the digital sideband is QPSK (quadrature phase shift keying) modulated at a symbol time (T) of 2.9 milliseconds (i.e., T=2.9 ms). Each OFDM symbol includes X+R samples formed by adding a cyclic prefix of R samples (e.g. R=112 samples) to an X-sample OFDM signal (e.g., X=2048 samples). The cyclic prefix is typically formed by prefixing a repetition of the last R samples of the X-sample OFDM signal to form an OFDM symbol having a total of X+R samples (e.g., X+R=2048+112=2160 samples per OFDM symbol). Prior to broadcasting, each OFDM symbol is weighted in the time domain by the pulse shaping function 150, which applies a weight from 0 to 1.0 to each of the 2160 samples within the OFDM symbol. As can be seen in FIG. 1B, this pulse shaping function will cause samples at the beginning and end of OFDM symbol to have reduced weight as compared to the other samples within the OFDM symbol.

To facilitate operation of HD Radio receivers or other digital radio receivers, it is desirable to detect the presence of digital content within the broadcast channel. For example, when an AM or FM broadcast channel is selected for reception in an HD Radio receiver, the HD Radio receiver will typically perform HD demodulation on the received channel and then attempt to detect OFDM digital signals within the demodulated signals by correlating the demodulated received signal with delayed versions of itself. The following equation, for example, can be applied for this delayed-version correlation technique using HD demodulation:

$$c(n)=c(n-1)+z(n)z^*(n-X)-z(n-R)z^*(n-X-R), \text{ where}$$
$$n=0 \ldots X+R-1 \quad \text{[EQUATION 1]}$$

For EQUATION 1, $z(n)$ represents a band-limited, complex OFDM signal sampled at 744.1875 ks/s (kilo-samples per second); $z^*(n-X)$ represents the complex conjugate of $z(n-X)$; and $c(n)$ represents the element correlation vector of an OFDM symbol. The element correlation vector $c(n)$ has X+R samples (e.g., X+R=2048+112=2160) and is typically averaged over multiple demodulated symbols to reduce the effect of noise. A peak in the averaged element correlation vector $c(n)$ is typically deemed to indicate the presence of an OFDM signal.

The HD demodulation correlation technique described above, however, has significant time and computational requirements that can degrade performance and increase device sizes. For example, reliable detection of OFDM signals in the presence of noise and impairments, such as multipath distortion, requires applying this HD demodulation correlation technique to average over 100 demodulated OFDM symbols. This required averaging for reliability leads to detection times of 300-400 milliseconds or more. Further, this HD demodulation correlation technique requires eight real multiplications and six real additions for each sample at a symbol rate (1/T) of 363.4 Hz. Thus, a total of about 11 million or more arithmetic operations are required per second for this technique, thereby leading to increased computational circuitry and related power requirements. Still further, the amount of memory required for this correlation technique is 4320 (i.e., 2160×2) complex words or 8640 bytes (i.e., 2160×2×2) thereby leading to increased die size for integrated devices that apply this correlation technique.

SUMMARY OF THE INVENTION

Systems and methods are disclosed for rapid detection of digital content within received radio frequency (RF) signals. The disclosed embodiments digitize received RF signals and apply a sliding window average to subsampled complex magnitudes for the digital samples to generate subsampled magnitude values. The subsampled magnitude values are then collected over a small number of symbols for the digital content, and the results are analyzed to determine whether or not digital content is present with the received signals. For example, multi-symbol histograms can be generated from the subsampled magnitude values and can then be utilized to make the determination of whether digital content is present in the received signals. Further, magnitude ratios can be generated from subsampled magnitude values accumulated over multiple symbols and can then be utilized to make the determination of whether digital content is present in the received signals. The resulting detection determination can be utilized further to control operations of systems utilizing the disclosed embodiments. The disclosed embodiments are useful, for example, in determining whether HD (High Definition) Radio digital content is present within audio broadcast channels by detecting effects of the pulse shaping function applied to OFDM (Orthogonal Frequency Division Multiplex) symbols for HD Radio broadcasts. Other features and variations can be implemented, as desired, and related systems and methods can be utilized, as well.

In one embodiment, a receiver system is disclosed for detecting digital content in a radio frequency (RF) channel, including front-end circuitry configured to receive radio frequency (RF) signals and to output signals associated with a channel within the RF signals, analog-to-digital conversion (ADC) circuitry configured to receive the output signals and to output digital samples having a real component (I) and an imaginary component (Q), complex magnitude determination circuitry configured to receive the digital samples and to generate complex magnitudes for the digital samples, sliding window averaging filter circuitry, and shape detection circuitry. The sliding window averaging filter circuitry is configured to subsample the complex magnitudes, to apply a sliding window average to the subsampled complex magnitudes, and to output subsampled magnitude values. The shape detection circuitry is configured to utilize subsampled magnitude values over a plurality of symbol times to determine if digital content is present within the channel having a digital content shaping function, the symbol time and the digital content shaping function being associated with digital content to be detected.

In further embodiments, a detection time for the receiver system to determine if digital content is present within the channel can be 50 milliseconds or less. Still further, the digital content within the channel can be included within OFDM (orthogonal frequency division multiplexed) symbols transmitted within the channel, and wherein the digital content shaping function comprises a pulse shaping function applied to each OFDM symbol. Still further, the sliding window averaging filter circuitry can include a first subsampler configured to receive the complex magnitudes and to output subsampled values, averaging filter circuitry configured to average a plurality of the subsampled values and to output averaged values, and a second subsampler configured to subsample the averaged values and to output the subsampled magnitude values.

In other embodiments, the shape detection circuitry can include buffer circuitry configured to store subsampled magnitude values for each OFDM symbol where each magnitude value having an associated index value, and the shape detection circuitry can include detection circuitry configured to detect a minimum value within the stored subsampled magnitude values, to output the index value associated with the detected minimum value for each OFDM symbol, and to form an index count histogram using index values output for a selected number of OFDM symbols. Further, the shape detection circuitry can be configured to determine a peak count value within the index count histogram and to compare the peak count value to a threshold value to determine if digital content is present within the channel having the pulse shaping function for the OFDM symbols. In addition, the sliding window averaging filter circuitry and the shape detection circuitry can be configured to independently process two sidebands within the channel to generate first and a second index count histograms, and the shape detection circuitry can be further configured to combine the first and second index count histograms to generate a combined index count histogram, to determine a peak count value within the combined index count histogram, and to compare the peak count value to a threshold value to determine if digital content is present within the channel having the pulse shaping function for the OFDM symbols. Still further, the shape detection circuitry can be configured to determine an index value associated with a peak count value within the index count histogram and to compare multiple index values over time to determine if digital content is present within the channel having the pulse shaping function for the OFDM symbols. In addition, the sliding window averaging filter circuitry and the shape detection circuitry can be configured to independently process two sidebands within the channel to generate first and a second index values and to compare multiple first and second index values over time to determine if digital content is present within the channel having the pulse shaping function for the OFDM symbols.

In still other embodiments, the shape detection circuitry can include demultiplexer circuitry configured to demultiplex the subsampled magnitude values into a plurality of demuxed subsamples, a plurality of accumulators configured to accumulate the demuxed subsamples for a plurality of OFDM symbols and to generate a plurality of accumulated values, and ratio detection circuitry configured to determine a ratio associated with accumulated values, wherein shape detection circuitry is further configured to compare the ratio to a threshold ratio to determine if digital content is present within the channel having the pulse shaping function for the OFDM symbols. In addition, the sliding window averaging filter circuitry and the shape detection circuitry can be configured to independently process two sidebands within the channel to generate first and a second ratios and to combine the first and second ratios into a combined ratio, and the shape detection circuitry can be further configured to compare the combined ratio to a threshold ratio to determine if digital content is present within the channel having the pulse shaping function for the OFDM symbols. Still further, the ratio can be a ratio of a minimum accumulated value to an average of the accumulated values within the accumulators.

In additional embodiments, the control circuitry can be configured to output a detection signal indicating whether or not digital content is determined to be present. Further, the digital content can be HD Radio digital content included within OFDM (orthogonal frequency division multiplexed) signals transmitted within the channel. Still further, the OFDM signals for the HD Radio digital content can be transmitted within the channel without associated analog content or can be transmitted within the channel within one or more sidebands associated with a center frequency for analog content also transmitted within the channel. In addition, the receiver can further include HD demodulator circuitry configured to demodulate HD Radio digital content, where the HD demodulator circuitry is configured to be powered or not powered depending upon whether or not the detection signal indicates that digital content is present within the channel.

In one further embodiment, a method for detecting digital content in a radio frequency (RF) channel includes receiving radio frequency (RF) signals, digitizing signals associated with a channel within the RF signals to generate digital samples having a real component (I) and an imaginary component (Q), determining complex magnitudes for the digital samples, applying a sliding window averaging filter to subsample the complex magnitudes and to average the subsampled complex magnitudes and to generate subsampled magnitude values, utilizing the subsampled magnitude values over a plurality of symbol times to determine if digital content is present within the channel having a digital content shaping function where the symbol time and the digital content shaping function is associated with digital content to be detected, and outputting a detection signal indicating whether or not digital content is present.

In further embodiments, a detection time to determine if digital content is present within the channel can be 50 milliseconds or less. Still further, the digital content can be included within OFDM (orthogonal frequency division multiplexed) symbols transmitted within the channel, and wherein the digital content shaping function comprises a pulse shaping function applied to each OFDM symbol.

In other embodiments, the method can include storing subsampled magnitude values for each OFDM symbol where each magnitude value having an associated index value, determining a minimum value within the stored subsampled magnitude values, outputting an index value associated with the detected minimum value for each OFDM symbol, and forming an index count histogram using index values output for a selected number of OFDM symbols. Further, the method can include determining a peak count value within the index count histogram and comparing the peak count value to a threshold value to determine if digital content is present within the channel having the pulse shaping function for the OFDM symbols. Still further, the method can include independently processing two sidebands within the channel to generate first and a second index count histograms, combining the first and second index count histograms to generate a combined index count histogram, determining a peak count value within the combined index count histogram, and comparing the peak count value to a threshold value to determine if digital content is present within the channel having the pulse shaping function for the OFDM symbols. In addition, the method can include determining an index value associated with a peak count value within the index count histogram and comparing multiple index values over time to determine if digital content is present within the channel having the pulse shaping function for the OFDM symbols. Still further, the method can include independently processing two sidebands within the channel to generate first and a second index values and comparing multiple first and second index values over time to determine if digital content is present within the channel having the pulse shaping function for the OFDM symbols.

In still other embodiments, the method can include demultiplexing the subsampled magnitude values into a plurality of demuxed subsamples, accumulating each of the demuxed subsamples for a plurality of OFDM symbols to generate a plurality of accumulated values, determining a ratio associated with accumulated values, and comparing the ratio to a threshold ratio to determine if digital content is present within the channel having the pulse shaping function for the OFDM symbols. Further, the method can include independently process two sidebands within the channel to generate first and a second ratios, combining the first and second ratios into a combined ratio, and comparing the combined ratio to a threshold ratio to determine if digital content is present within the channel having the pulse shaping function for the OFDM symbols.

In additional embodiments, the digital content can be HD Radio digital content included within OFDM (orthogonal frequency division multiplexed) signals transmitted within the channel. Still further, the OFDM signals for the HD Radio digital content can be transmitted within the channel without associated analog content or can be transmitted within the channel within one or more sidebands associated with a center frequency for analog content also transmitted within the channel. In addition, the method can further include controlling whether or not an HD demodulator is powered based upon whether or not the detection signal indicates that digital content is present within the channel. Also, the method can include determining whether digital content is present for a plurality of channels within the RF signals and storing for each channel an indication of whether digital content is present or is not present within the channel.

Other features and variations can be implemented, as desired, and related systems and methods can be utilized, as well.

DESCRIPTION OF THE DRAWINGS

It is noted that the appended drawings illustrate only example embodiments of the invention and are, therefore, not to be considered limiting of its scope, for the invention may admit to other equally effective embodiments.

FIG. 5A is a block diagram of an example embodiment for determining index values for negative peaks within subsampled magnitude values from a sliding window averaging filter.

FIG. 5B is a block diagram of an example embodiment that utilizes the index values from the embodiments of FIG. 5A to form N-symbol index count histograms that are used detect the presence of HD content within received signals.

DETAILED DESCRIPTION OF THE INVENTION

Systems and methods are disclosed for rapid detection of digital content within received radio frequency (RF) signals. The disclosed embodiments digitize received RF signals and apply a sliding window averaging filter to subsampled complex magnitudes for the digital samples to generate subsampled magnitude values. The subsampled magnitude values are then collected over a small number of symbols for the digital content, and the results are analyzed to determine whether or not digital content is present with the received signals. The disclosed embodiments are useful, for example, in determining whether HD (High Definition) Radio digital content is present within audio broadcast channels by detecting effects of the pulse shaping function applied to OFDM (Orthogonal Frequency Division Multiplex) symbols for HD Radio broadcasts. Other features and variations can be implemented, as desired, and related systems and methods can be utilized, as well.

Figure 1A:
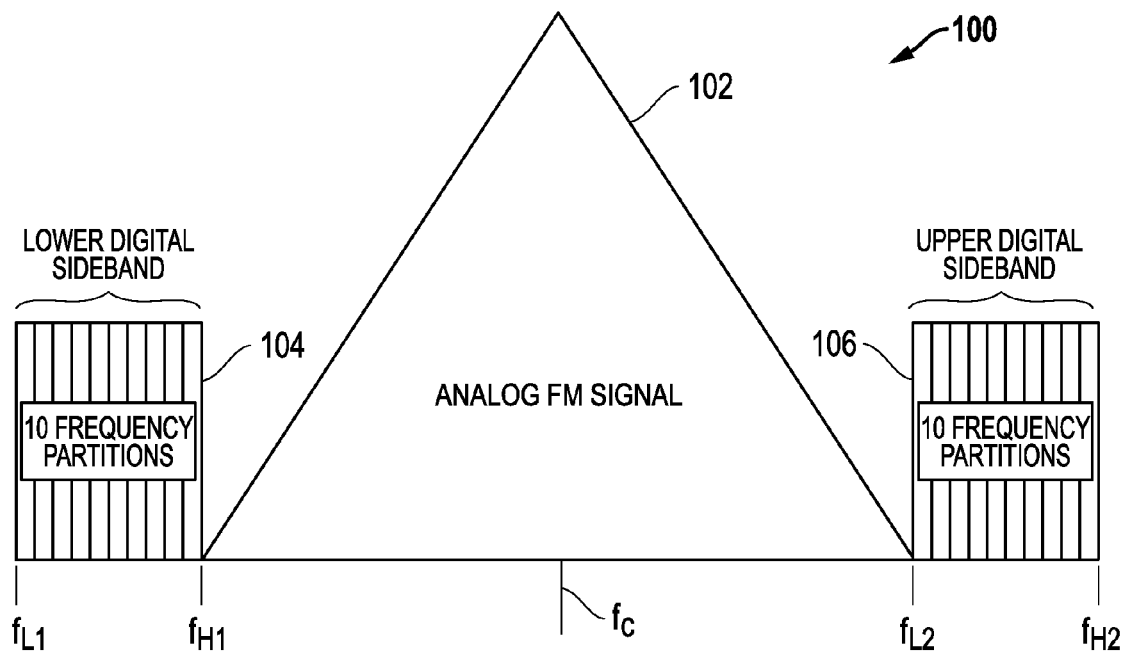
FIG. 1A (Prior Art) is a signal diagram for an FM audio broadcast channel that includes HD Radio content in upper and lower sidebands.
Figure 1B:
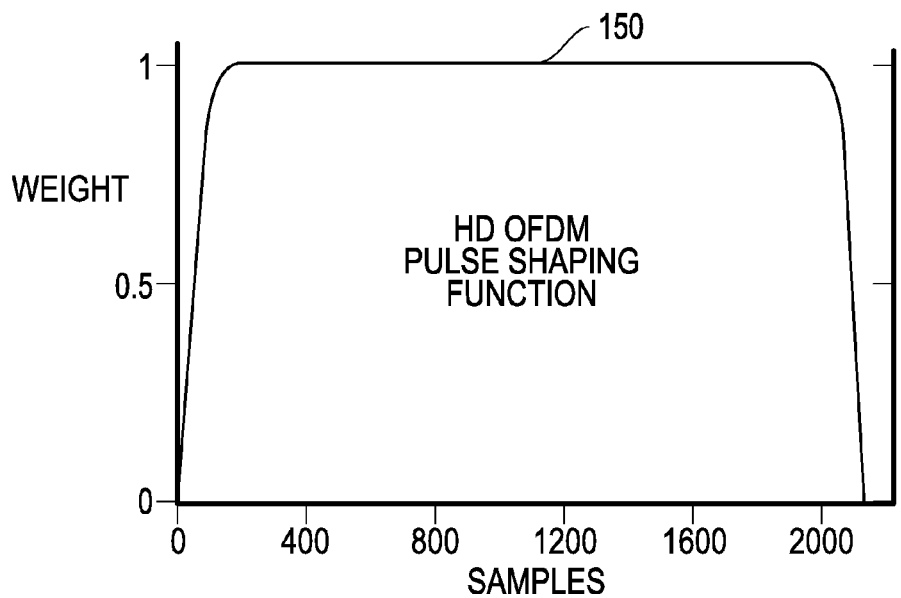
FIG. 1B (Prior Art) is a signal diagram for a pulse shaping function used for shaping OFDM (orthogonal frequency division multiplexed) broadcast signals for HD Radio.

As described herein, the disclosed embodiments efficiently and rapidly detect the presence of shaped digital content within broadcast channels. This rapid detection of shaped digital content is useful for receiver systems, such as HD Radio receiver systems. For example, in order to implement seek and band scan capabilities, HD Radio receiver systems have the need to rapidly evaluate whether digital content is being broadcast in the HD Radio sidebands for a center frequency of broadcast channels being analyzed. As described above with respect to FIG. 1A (Prior Art), HD Radio is a digital radio broadcasting standard that transmits digital content on OFDM signals within upper and lower digital sidebands in frequency ranges above and below the center frequency ($f_C$) for analog content within the broadcast channel, such analog content for AM or FM broadcast channels. The upper and lower digital sidebands convey redundant information so that an HD receiver can still decode HD digital content when only one digital sideband is detected or available, such as where one sideband is impaired by an interferer. To achieve rapid detection of digital content within the received signals, the embodiments described herein detect the effect of a digital shaping function within the received signals. One example for digital content that can be rapidly detected is digital content for HD Radio broadcasts that use OFDM symbols shaped using the pulse shaping function described with respect to FIG. 1B (Prior Art), which reduces sample weights for samples at the beginning and end of the OFDM symbols being transmitted.

It is again noted that OFDM signals for HD digital content can be transmitted in an all digital mode such that the analog signal in the center of the channel is replaced with OFDM signals having the HD digital content. As such, only HD digital content is transmitted within the channel for this all-digital mode of HD Radio transmissions. For such an embodiment, where OFDM signals are transmitted within a frequency band centered around the center frequency ($f_C$) for the all digital channel, the signals within the center of the channel are used to detect HD digital content rather than upper/lower sidebands within the digital-plus-analog HD Radio transmissions.

Prior techniques for detection of the presence of HD digital content can be slow, computationally intensive, require significant hardware resources (e.g., complex multipliers and memory), and takes hundreds of milliseconds to detect weak signals. Advantageously, the embodiments described herein significantly reduce detection time, hardware resources, and power consumption. For example, the disclosed embodiments provide fast detection times of under 100 milliseconds and preferably under 40-50 milliseconds as opposed to the hundreds of milliseconds typically required for prior solutions. Further, the disclosed embodiments use less power than existing techniques that rely upon HD Radio demodulator circuitry for detection of HD digital content. In addition, the disclosed embodiments effectively reduce the size requirements for integrated circuitry used for the detection of HD digital content and can be implemented as stand-alone circuitry separate from HD Radio demodulator circuitry. Still further, using the disclosed embodiments, HD Radio demodulator circuitry can be powered down to save power during seek and band scan operations and to save power when no HD digital content is present or detected in a selected broadcast channel to be tuned.

Figure 2:
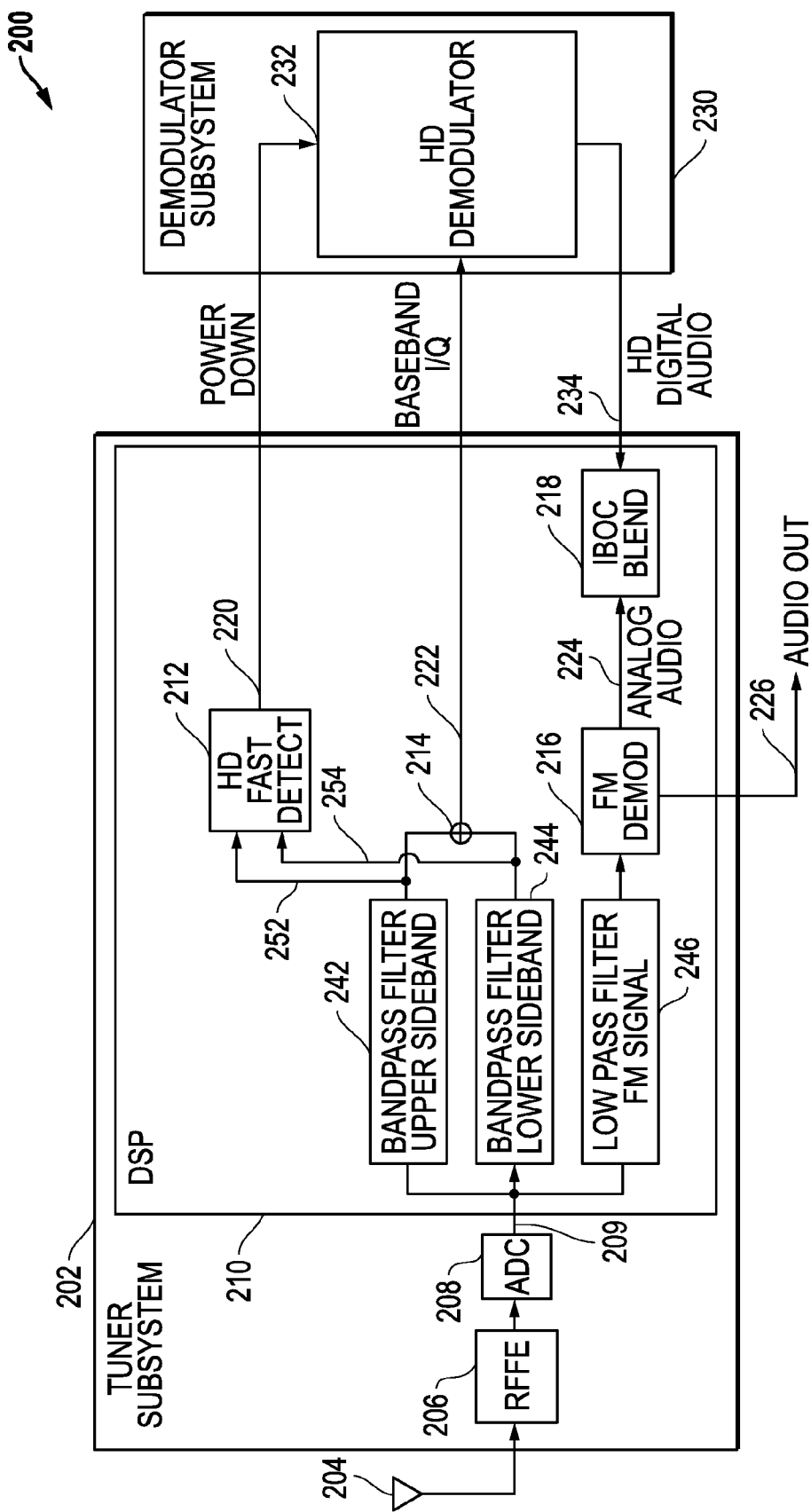
FIG. 2 is a block diagram of an embodiment for an HD Radio receiver system that includes a tuner subsystem and an HD demodulator subsystem.

FIG. 2 is a block diagram of an embodiment 200 for an HD Radio receiver system that includes a tuner subsystem 202 and HD demodulator subsystem 230. For the embodiment 200 depicted, an incoming RF (radio frequency) signals are received by antenna 204 and provided to RFFE (RF front end) circuitry 206. The RFFE circuitry 206 receives the RF input signals and outputs signals associated with the channel to be tuned. For example, the RFFE circuitry 206 can use a mixer to down-convert a selected broadcast channel within the received RF signal spectrum to a lower frequency. This down-converted frequency can be, for example, a low intermediate frequency (IF), such as about 100-150 kHz, or a direct down-conversion frequency of zero IF (i.e., 0 Hz). Other IF frequencies can also be utilized as desired. The down-converted RF signals can include real (I) and imaginary (Q) components, if desired. Output signals from the RFFE circuitry 206 are then digitized by analog-to-digital conversion (ADC) circuitry 208 to provide digital output signals. These digital output signals can also include real (I) and imaginary (Q) components. The digital I/Q samples 209 from the ADC circuitry 208 are provided to the upper sideband BPF (bandpass filter) 242, the lower sideband BPF (bandpass filter) 244, and the FM signal LPF (low pass filter) 246 within digital signal processing (DSP) circuitry 210. The DSP circuitry 210 also includes summation circuitry 214, HD fast detect circuitry 212, FM demodulator (demod) circuitry 216, and IBOC (in-band on channel) blend circuitry 218. The DSP circuitry 210 communicates with the HD demodulator circuitry 232 within the demodulator subsystem 230. It is noted that for some embodiments the tuner subsystem 202 can be implemented within a first integrated circuit, and the demodulator subsystem 230 can be implemented within a second integrated circuit. Other variations could be implemented, as desired.

Looking back to embodiment 200, the summation circuitry 214 combines the upper sideband filtered digital I/Q samples 252 and the lower sideband filtered digital I/Q samples 254 to generate combined I/Q samples. These combined I/Q samples are provided as baseband I/Q samples 222 to the HD demodulator circuitry 232 within the demodulator subsystem 230. It is noted that further digital decimation or down-conversion can be provided with respect to the summation circuitry 214, if desired, to down-convert the combined I/Q samples to baseband (i.e., 0 Hz). The HD demodulator circuitry 232 demodulates the HD digital content within the baseband I/Q samples 222 to produce HD digital audio signals 234. These HD digital audio signals 234 are provided to the IBOC blend circuitry 218. The FM demodulator circuitry 216 also receives the digital I/Q samples 209 from the ADC circuitry 208 and outputs demodulated analog audio signals 224 to IBOC blend circuitry 218. The IBOC blend circuitry 218 is controlled to provide blending between the HD digital audio signals 234 and the analog audio signals 224 for a selected broadcast channel being tuned.

As described in more detail herein, the HD fast detect circuitry 212 receives the filtered digital I/Q samples 252/254 and determines whether digital content is present within the selected broadcast channel being tuned. If digital content is not detected, then the power down signal 220 is used to provide a control signal indicating that the HD demodulator circuitry 232 is to be powered down or is to remain powered down (e.g., if already powered down). If HD Radio content is detected, then the power down signal 220 is used to indicate that the HD demodulator circuitry 232 is to be powered up or is to remain powered up in order to demodulate the HD digital content. It is noted that for seek and/or band scan operations, it may be desirable to store indications of which broadcast channels include digital content without powering up the HD demodulator circuitry 232. It is further noted that for reception of AM broadcast signals, an AM demodulator block would be utilized instead of the FM demodulator circuitry 216, and an AM signal LPF would be utilized instead of the FM signal LPF 246. Other variations could be implemented, as desired.

As described herein, the HD fast detect circuitry 212 detects the presence of shaped digital content, such as HD Radio digital content, by applying a sliding window averaging filter to the complex magnitudes for digital I/Q samples and by detecting the effect of the pulse shaping function on the complex magnitude values for the received signals. The disclosed sliding window averaging techniques operate in the real domain and are able to independently detect each digital sideband. No multipliers are required. The number of arithmetic operations is reduced to less than 0.5 million additions per second. Memory requirements are reduced to about 100 bytes. And detection time is reduced to the time of a small number OFDM symbols, thereby leading to rapid detection times (e.g., tens of milliseconds or less). For example, the embodiments described herein provide digital content detection times of less then about 100 milliseconds and preferably less than about 40 milliseconds, depending upon the number of symbols used for detection and the associated symbol times. Further, the reduction in hardware requirements as compared to prior solutions allows the disclosed detection embodiments to be implemented with stand-alone circuitry that can be operated separately from HD demodulator circuitry. Such a stand-alone implementation can result in significant system-level power reduction as the HD demodulator hardware can be powered down during seek and band scan operations and also when no HD digital content is present or detected for the channel to be tuned.

Figure 3:
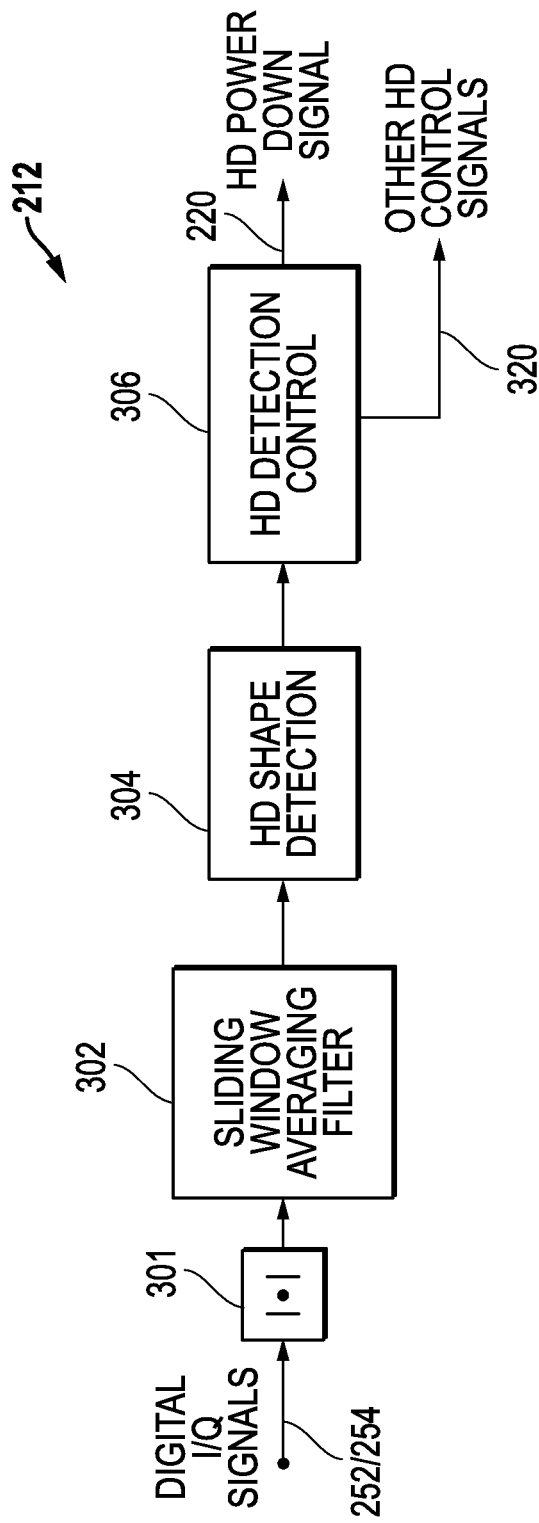
FIG. 3 is a block diagram of an example embodiment for HD fast detect circuitry that applies a sliding window averaging filter to complex magnitudes for digital samples to detect the presence of HD digital content.

FIG. 3 is a block diagram of an example embodiment for HD fast detect circuitry 212. The filtered digital I/Q samples 252/254 are received by complex magnitude detection circuitry 301, which in turn provides complex magnitudes for the digital receive samples to sliding window averaging filter circuitry 302. The sliding window averaging filter circuitry 302 generates magnitude values for each OFDM symbol that are subsampled, combined and averaged, as described in more detail below. The subsampled magnitude values from sliding window averaging filter circuitry 302 are provided to HD shape detection circuitry 304, which analyzes the subsampled magnitude values in order to identify the effect of the HD shaping function on the sample data. The output of the HD shape detection circuitry 304 is provided to the HD detection control circuitry 306, which can provide further processing, as desired, and can generate related control signals. For example, an HD power down signal 220 can be provided to power down HD demodulator circuitry when HD content is not detected and to power up HD demodulator circuitry when HD content is detected. If desired one or more other HD control signals 320 can also be provided by the HD detection control circuitry 306, as well. Other variations could be implemented, as desired.

Figure 4:
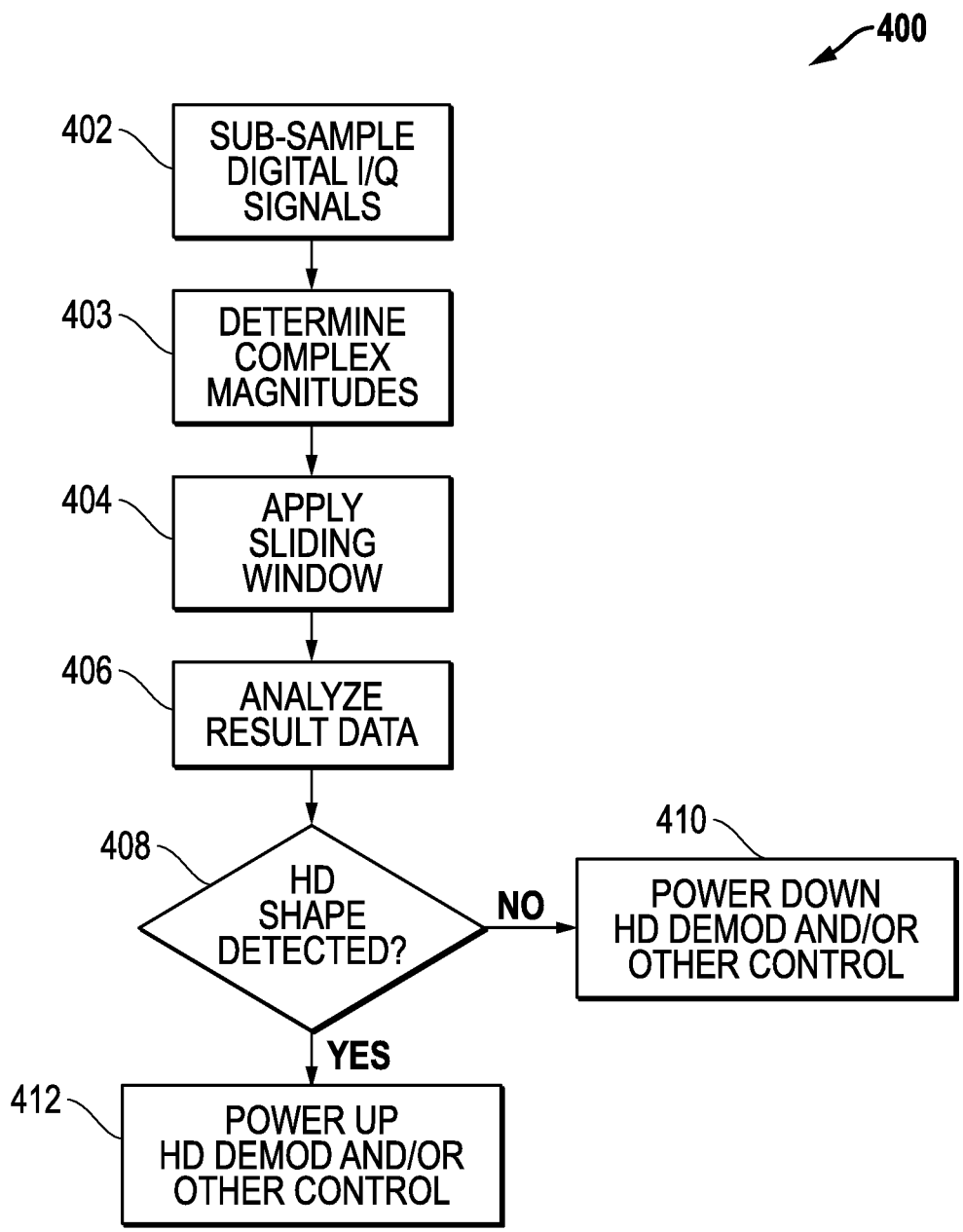
FIG. 4 is a process flow diagram of an example embodiment for applying a sliding window averaging filter to complex magnitudes for digital samples to detect the presence of HD digital content.

FIG. 4 is a process flow diagram of an example embodiment 400 for applying a sliding window averaging filter to detect the presence of HD digital content. In block 402, digital I/Q samples related to the received RF signals for a selected broadcast channel to be tuned are subsampled. In block 403, complex magnitude values are determined for the subsampled digital receive signals. In block 404, a sliding window averaging filter is applied to the complex magnitude values for the subsampled digital I/Q samples. In block 406, the resulting data is analyzed to detect the effect of the HD shaping function in the received signals. In block 408, a determination is made whether or not the shape of the HD shaping function has been detected in the resulting sample data. If the determination is "NO," then block 410 is reached where the HD demodulator is powered down or kept powered down. Different or additional control signals can also be provided relating to the non-detection of HD content within the received signal. For example, if the radio is performing a seek or scan operation, then the non-detection determination can be utilized to indicate that no HD content has been detected for the selected broadcast channel. If the determination is "YES," then block 412 is reached where the HD demodulator is powered up or kept powered up. Different or additional control signals can also be provided relating to the detection of HD content on the received signal. For example, if a receiver system is performing a seek or scan operation, then the detection determination can be utilized to generate an indication for each channel processed of whether or not HD digital content was detected for the channel. These indications can then be stored for future use. Other variations could also be implemented, as desired.

Figure 5C:
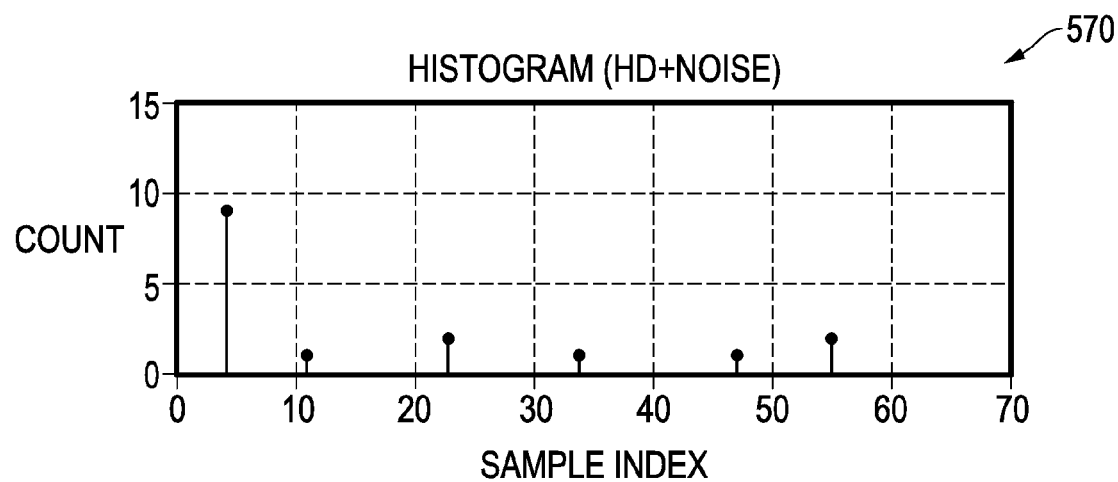
FIG. 5C is an example result diagram for an N-symbol index count histogram where the received signal includes HD content and noise.
Figure 5D:
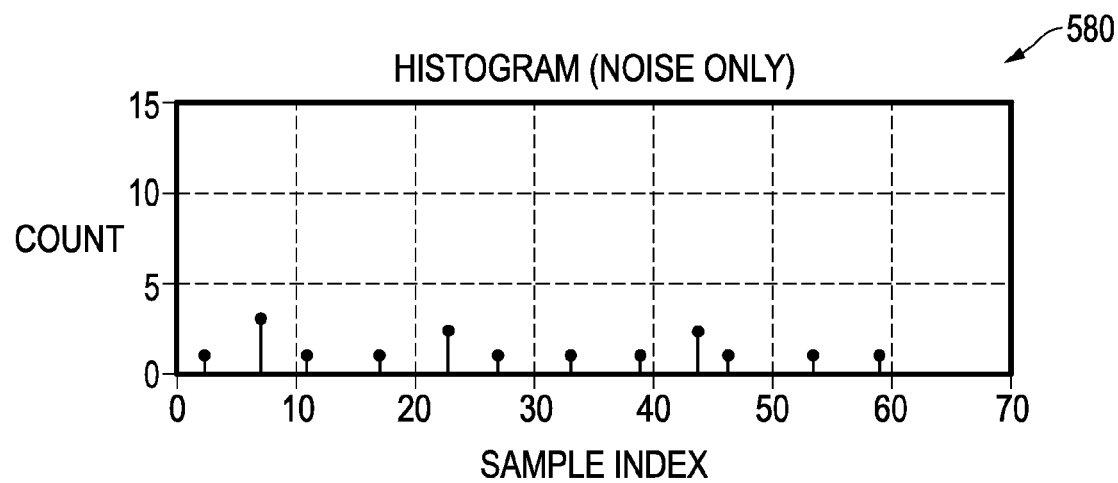
FIG. 5D is an example result diagram for an N-symbol index count histogram where the received signal includes only noise.
Figure 5E:
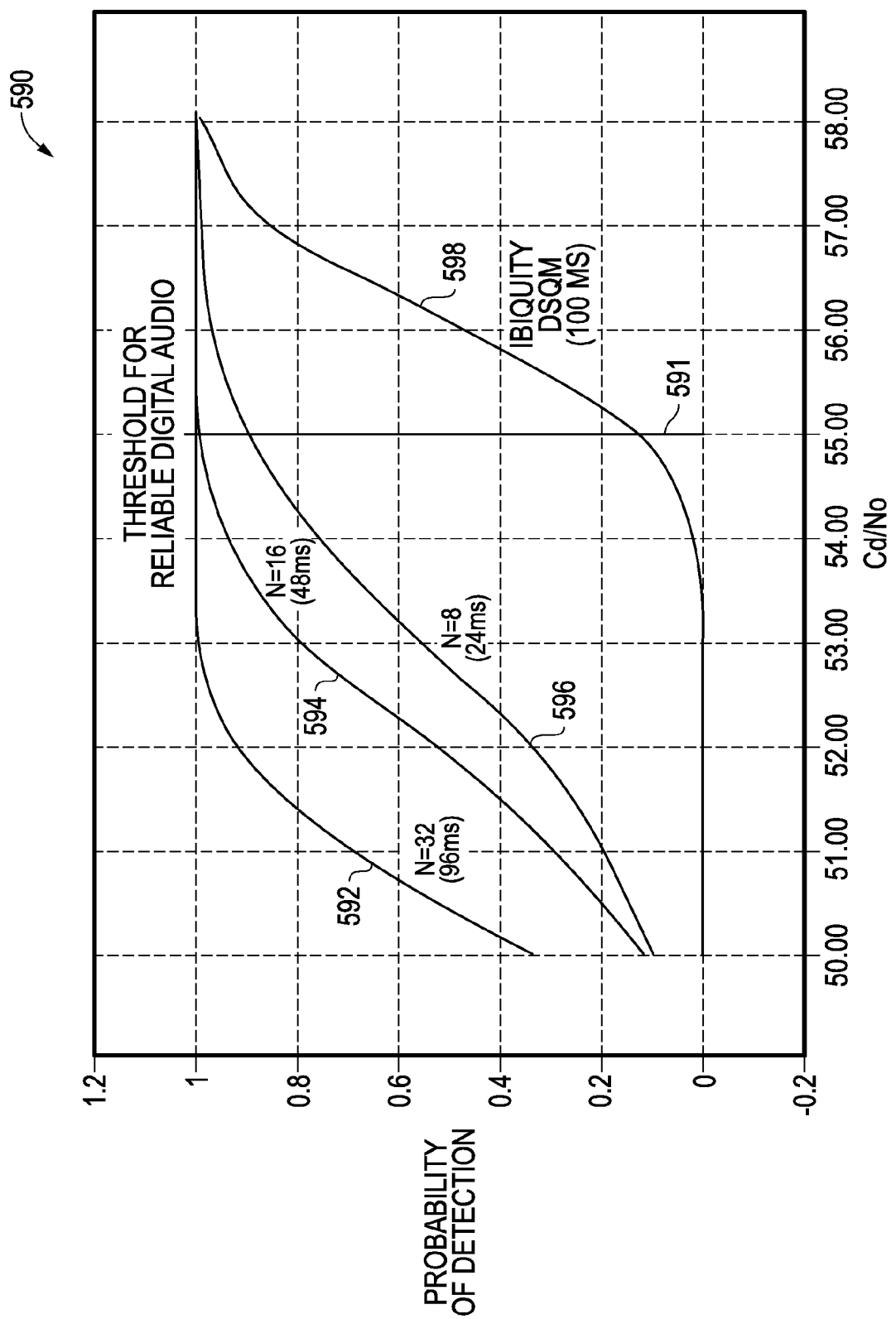
FIG. 5E is an example diagram for probabilities of detection for different symbol detection periods for the N-symbol histograms as compared to a prior solution.
Figure 6:
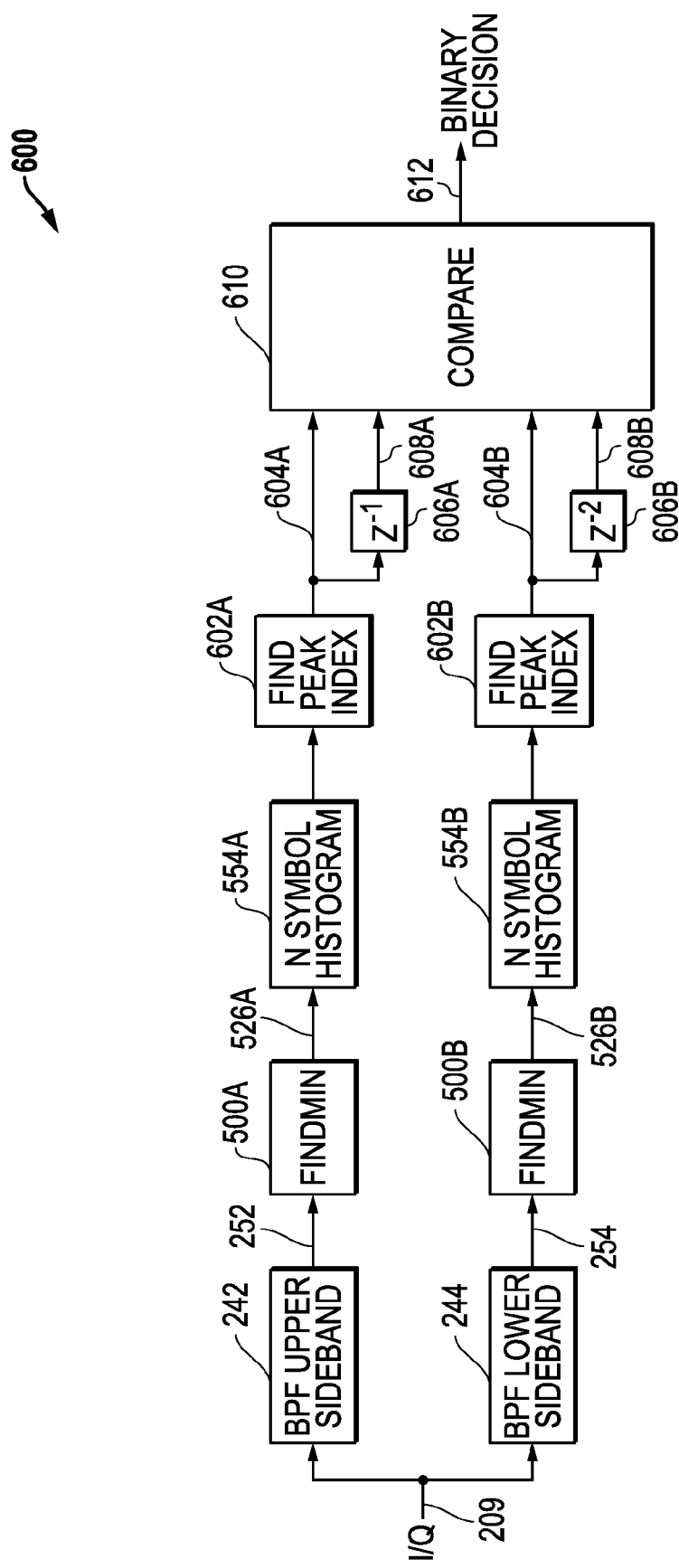
FIG. 6 is a block diagram of an example embodiment that compares index values associated with peak count values within N-symbol histograms to detect the presence of HD content within received signals.
Figure 7A:
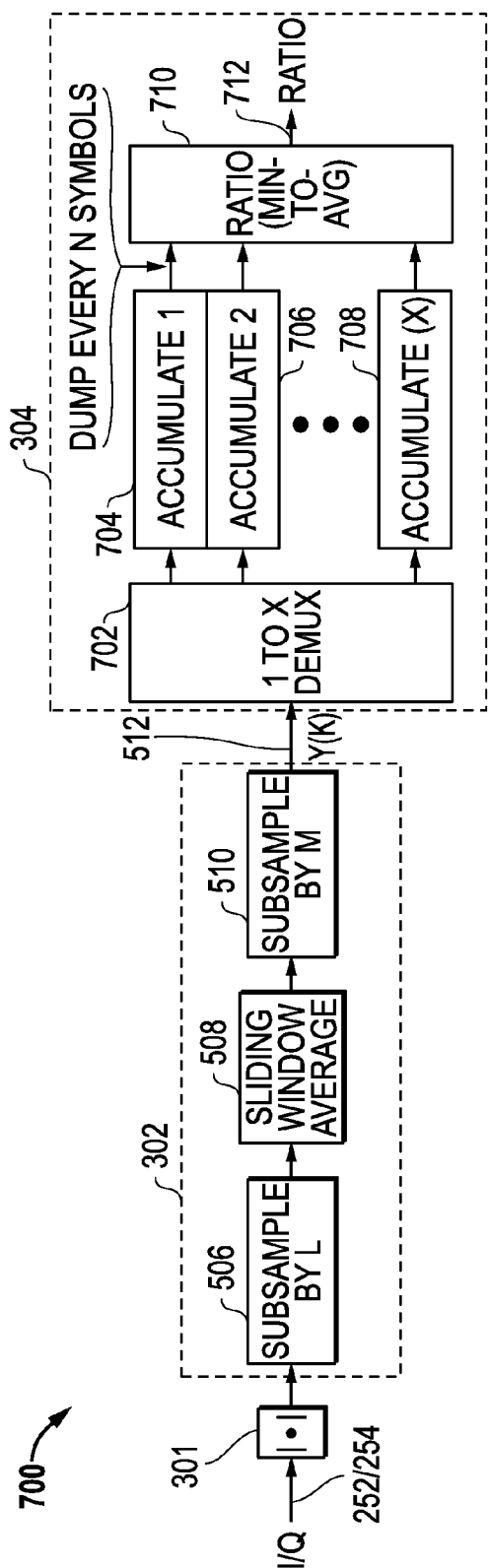
FIG. 7A is a block diagram of an example embodiment that determines a ratio associated with complex magnitudes within subsampled magnitude values from a sliding window averaging filter.
Figure 7B:
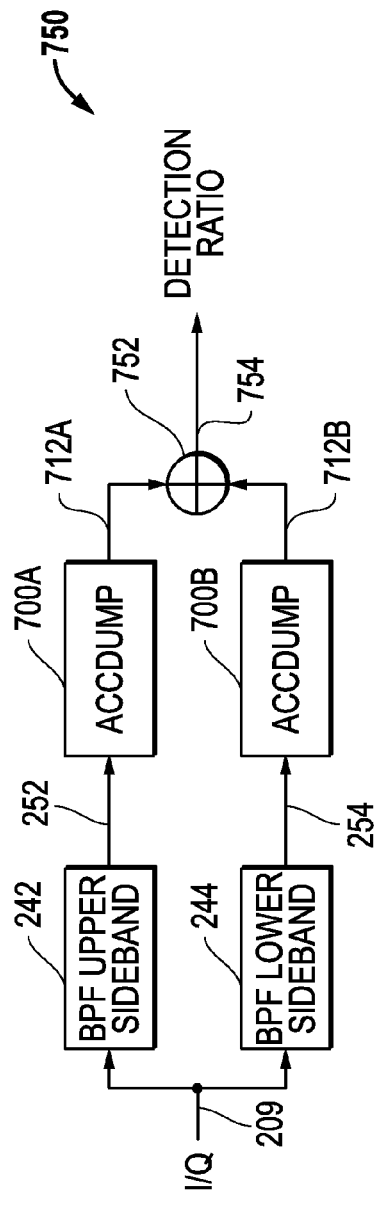
FIG. 7B is a block diagram of an example embodiment that utilizes ratio determination blocks according to FIG. 7A to detect the presence of HD content within received signals.

As indicated above, the resulting magnitude values from the sliding window averaging filter can be analyzed to determine whether or not the effect of the HD shaping function has been detected in the received signal. FIGS. 5A-B provide an example technique that looks for negative peak values within resulting magnitude values for received OFDM symbols, and then generates a index count histogram using negative peak index results over multiple OFDM symbol periods. A comparison of the histogram peak count values to threshold values is used to indicate whether or not HD digital content has been detected. FIGS. 5C-E provide result diagrams relating to the embodiments of FIGS. 5A-B. FIG. 6 provides an example technique that also looks for negative peak values within the resulting magnitude values for received OFDM symbols and then compares index values for these negative peak values to make the HD content determination. FIGS. 7A-B accumulate the resulting magnitude values over multiple received OFDM symbols and then compares magnitude ratios associated with the accumulated values to make the HD content determination. Other techniques and/or combinations of techniques could be utilized, as desired, while still utilizing the sliding window averaging techniques described herein.

FIG. 5A is a block diagram of an example embodiment 500 for detecting negative peak values within a subsampled sliding window for received signals. For embodiment 500, the sliding window averaging filter circuitry 302 includes subsampler 506, sliding window average block 508, and subsampler 510. The HD shape detection circuitry 304 includes buffer 522 and minimum value analyzer 524. The complex magnitude detector 301 receives digital I/Q samples 252/254, which can be a filtered version of digital I/Q samples 209, as described above. The digital I/Q samples 252/254 are received at a rate associated with the digital content to be detected. For example, with respect to HD Radio signals, the digital I/Q samples 209 are received by the complex magnitude detector 301 at 2160 samples per symbol with a symbol time (T) of 2.9 ms. The complex magnitude values (e.g., absolute value) from block 301 are provided to subsampler 506 where they are subsampled by "L." The output samples from subsampler 506 are then provided to sliding window average block 508, which is described in more detail below. The output samples from block 508 are then provided to subsampler 510 where they are further subsampled by "M." The subsampled sliding window output sequence (y(k)) 512 is then provided to buffer 522, which holds magnitude values and related index values for K samples, where K=2160/(L*M) samples for HD Radio. The subsampled result data within buffer 522 is provided to detection block 524, which operates to determine an index value for the minimum value (i.e., negative peak value) within the buffer for each symbol. As such, the output signal 526 for embodiment 500 represents the index for the minimum value within the subsampled sliding window result data for each symbol. In other words, an index for one value within the buffer 522 is output for each symbol at the symbol rate ($f_{SYM}=1/T$).

FIG. 5B is a block diagram of an example embodiment 550 that utilizes index values from the minimum detection blocks (FINDMIN) 500A and 500B to detect the presence of HD content within received signals. The minimum detection blocks (FINDMIN) 500A and 500B are each implemented as shown for embodiment 500 in FIG. 5A. As described above, the digital I/Q samples 209 can be provided to an upper sideband BPF 242 and a lower sideband bandpass BPF 544 to generate filtered I/Q samples 252 and 254, respectively. The upper sideband BPF 242 isolates the frequency range for the upper HD Radio sideband for the selected channel and provides the filtered digital samples as I/Q samples 252 at the sampling rate ($f_S$) to the negative peak detection block (FINDMIN) 500A. The minimum index output signal 526A from block (FINDMIN) 500A is provided at the symbol rate ($f_{SYM}$) to histogram 554A that stores index count values for N-symbols for the upper sideband. Similarly, lower sideband BPF 244 isolates the frequency range for the lower HD Radio sideband for the selected channel and provides the filtered digital samples as I/Q samples 254 at the sampling rate ($f_S$) to the negative peak detection block (FINDMIN) 500B. The minimum index output signal 526B from block (FINDMIN) 500A is provided at a subsampled rate ($f_{SYM}$) to a histogram 554B that stores index count values for N-symbols for the lower sideband. Summation block 556 combines the N-symbol histogram 554A for the upper sideband and the N-symbol histogram 554B for the lower sideband. The summation block 556 then provides the summed result at a reduced N-symbol rate ($f_{SYM}/N$) to detection block 558 where a peak value is determined from the combined N-symbol histogram values. This peak value signal 560 from block 558 is provided as an output for embodiment 550 and is used to determine whether or not HD content exists within the received signal. In particular, the peak value signal 506 can be compared to a threshold value to determine whether or not HD content has been detected within the received signals.

With respect to HD Radio signals, it is noted that a sampling rate ($f_S$) of 744.1875 ks/s can be used for a symbol time (T) of about 2.9 ms to generate 2160 samples per symbol. Where L=4 and M=9, the number of samples output by sliding window averaging filter circuitry 302 is 60 samples per symbol. And this same number (K=2160/(L*M)) of samples can be stored in the buffer 522 for each symbol. Other sampling rates ($f_S$) and subsampling values (L,M) could be utilized, and different numbers of symbols (N) could be used for the N-symbol histograms, as desired. Further, if desired, these values including the number of symbols (N) can be configured to be programmable, for example, through register settings for an integrated circuit including the embodiments described herein.

For embodiment 550, therefore, a number of processing steps are performed on upper and lower sidebands, although these steps could be performed on only one sideband, if desired. First, bandpass filters 242 and 244 are applied to the upper and lower sidebands, respectively. Next, the minimum detection blocks (FINDMIN) 500A and 500B are used for each sideband. As shown in FIG. 5A, the complex magnitudes (e.g., absolute value) of the sideband samples are determined using complex magnitude determination block 301. The complex magnitudes are then subsampled by L (e.g., L=4) in block 506. A sliding window averaging filter is then applied in block 508. The following equations represent a sliding window averaging filter that can be utilized for block 508:

$$y(n) = \sum_{k=0}^{P-1} x(n-k) \quad \text{[EQUATION 2A]}$$

$$y(n+1) = y(n) + x(n+1) - x(n-P) \quad \text{[EQUATION 2B]}$$

For EQUATION 2A, x(n) represents input sample values, and y(n) represents a sliding window average of P sample values including the $n^{th}$ sample and the previous P−1 samples. For EQUATION 2B, the sliding window average for the next sample y(n+1) is equal to the previous sliding window average y(n) plus the next sample value x(n+1) less the previous last sample value x(n−P). The filter output signals y(n) will have negative peaks (e.g., relatively small magnitude values) at the OFDM symbol edges, if OFDM digital content is present. It is noted that the value for P can be selected, as desired. As one example, the value for P can be selected as the length (R) of the cyclic prefix in samples divided by L. Using this example, if L=4 and R=112 samples, then P would be selected to be 28 (e.g., P=R/L=112/4). It is further noted that EQUATION 2A could include dividing by P to generate an average. However, as such a divide-by-P would simply act as a scaling factor, the divide-by-P can be removed from EQUATION 2A for simplicity. In short, whether a divide-by-P is included or not in EQUATION 2A, the EQUATIONS 2A and 2B above can be utilized to provide a sliding window average. Other sliding window average implementations could also be utilized, if desired.

For the embodiment shown in FIG. 5A, the output signals from the sliding window averaging filter 508 are next subsampled by M (e.g., M=4) in block 510 to produce subsampled sliding window output sequence 512, which can be represented as y(k) where k is 1 to K samples. As an example, where K=2160/(L*M) samples for HD digital content and where L=4 and M=9, K is 60 samples per symbol for the HD digital content. The y(k) sequence 512 will have periodic negative peaks at the OFDM symbol rate if HD digital content is present. If one sideband is impaired by an interferer, the shaping function signature of the HD Radio signal can still be detected in the sequence from the unimpaired sideband. Information from both sidebands can be aggregated to make detection from a single sideband or both sidebands possible. As further shown in FIG. 5A, the y(k) sequence 512 with respect to each sideband are further processed. First, the y(k) sequence 512 is written to a K element circular buffer 522. Once per symbol (every K samples), the index of the minimum value in the buffer is detected in block 524. This index value for the negative peak for each symbol is provided as the index output signal 526 for the minimum detection block 500.

For the double sideband detection embodiment shown in FIG. 5B, upper sideband index values 526A are generated and an index count is stored in a histogram 554A over N symbols, and lower sideband index values 526B are generated and an index count is stored in a histogram 554B over N symbols. The two N-symbol histograms 554A and 554B are then aggregated by summation block 556 and provided to analyzer block 558 as combined N-symbol histogram index count values. Every N symbols, the analyze block 558 performs a peak search over the aggregated N-symbol histogram. If a peak count value is detected that is greater than or equal to a selected threshold value, then HD digital content is deemed to have been detected. Otherwise, no HD digital content is deemed to have been detected. Other variations could also be implemented, as desired, with respect to the use of peak count values within N-symbol histograms to indicate presence of HD digital content.

FIGS. 5C-D provide example N-symbol histograms associated with the detection technique described with respect to FIGS. 5A-B. FIG. 5C is an example result diagram 570 for an N-symbol histogram where the signal includes HD digital content and noise. FIG. 5D is an example result diagram 580 for an N-symbol histogram where the signal includes only noise. For these example histograms, the x-axis represents the sample index number, and the y-axis represents the number of times the index number was produced by the algorithm over an N-symbol detection period. The detection technique was applied with L=4, M=9, and N=16. Thus, the subsampled OFDM symbols are represented by 60 index values (e.g., K=2160/(L*M)=60), and negative peak index values are determined and aggregated for a 16-symbol detection period. The resulting index count histogram indicates the number of times each index value was associated with the detected negative peak out of the 16 symbols for which a negative peak was detected (i.e., N=16). For the representative result diagram 570 in FIG. 5C for a received signal including HD content and noise, a relatively high count number (e.g., count of 9) is seen for one of the index values (e.g., index 4) within the histogram, while the counts for other index values remain relatively low (e.g., less than about 3). For the representative result diagram 580 in FIG. 5D for a received signal including only noise, no large count numbers are seen within the histogram, and the counts for all index values remain relatively low (e.g., less than about 3). It is noted that for diagrams 570 and 580, the total number of counts in each diagram is 16 (i.e., N=16).

To determine a threshold count level for indicating when HD content is present, the negative peak detection technique can be run a large number of times for a given implementation. For example, after 1,000 runs of the detection technique for HD content where N is set to 13 symbols, thereby providing a detection time of about 38 ms (e.g., 13×2.9 ms), no significant overlap was evident between the peak count values for the HD-plus-noise and noise-only scenarios. As such, a threshold count number could be selected to indicate reliable detection of the HD content. In particular, after conducting 1,000 runs, it was determined that a threshold count level of about 6 could be used to as an indication of whether HD content was present. In other words, if a peak count value of 6 or more were detected within a 13-symbol histogram for received signals, HD content could be correctly deemed to be present within the received signals. Alternatively, if a peak count value of less than 6 were detected within a 13-symbol histogram for received signals, HD content could be correctly deemed not to be present within the received signals. Other threshold values could also be determined and/or utilized, as desired, depending upon the implementation details selected for the negative peak detection technique.

FIG. 5E is an example diagram 590 for probabilities of detection for different symbol detection periods for the N-symbol histograms as compared to a prior solution. The x-axis represents the digital carrier-to-noise ratio (Cd/No) in decibels per Hertz (dB-Hz). The y-axis represents the probability of detection of digital content. The vertical line 591, which is located at a Cd/No level of 55 dB-Hz, represents the threshold for reliable digital audio reception of HD Radio digital content. In other words, Cd/No levels below level 591 typically yield inadequate reception quality to use the HD Radio digital content, and the analog content is used instead or blended with the HD Radio digital content. Alternatively, Cd/No levels above this threshold level typically provide high enough reception quality that the HD Radio digital signal can be used for providing good quality audio outputs. Preferably, therefore, it is desirable to detect the presence of HD Radio digital content having a Cd/No level near or above the threshold line 591.

The negative peak detection techniques described herein achieve this goal of detecting the presence of HD Radio digital content having a Cd/No level near or above the threshold line 591. The line 592 represents the probability of detection for the embodiments of FIGS. 5A-B where N is set to 32 for the N-symbol histogram, and the associated detection time is about 93 ms (e.g., about 32×2.9 ms). The line 594 represents the probability of detection for the embodiments of FIGS. 5A-B where N is set to 16 for the N-symbol histogram, and the associated detection time is about 46 ms (e.g., about 16×2.9 ms). The line 596 represents the probability of detection for the embodiments of FIGS. 5A-B where N is set to 8 for the N-symbol histogram, and the associated detection time is about 23 ms (e.g., about 8×2.9 ms). As seen in FIG. 5E, line 592 (N=32) and 594 (N=16) provide a nearly 100 percent detection probability for Cd/No levels at the threshold 591, while line 596 (N=8) provides about a 90 percent detection probability for Cd/No levels at the threshold 591. In contrast, line 598 represents the probability of detection for an iBiquity digital signal quality metric (DSQM) for detection of HD Radio digital content where the detection time is about 100 ms. As shown, line 598 for the prior iBiquity DSQM provides about a 10 percent detection probability for Cd/No levels at the threshold 591 and does not reach 100 percent until a Cd/No level of about 58 dB-Hz is reached, while still taking 100 ms or more to complete the detection process for the DSQM operation. Thus, as seen in FIG. 5E, the negative peak detection techniques provide significantly improved detection probabilities along with reduced detection times.

For the embodiments described with respect to FIGS. 5A-B, the negative peak index values for N-symbols are used to generate the histogram that is used to make a determination of whether HD content is present. The detection time is associated with the number of symbols "N" used for the N-symbol histogram. As described above, using the negative peak detection technique, accurate determinations of whether HD content is present can be made even though only 8 symbols are used. In particular, an HD detection accuracy of 90 percent or more is achieved at a Cd/No level of 55 dB-Hz while using only a little more than about 23 milliseconds (e.g., about 8×2.9 ms). It is noted that different detection times, and related number of symbols for the N-symbol histograms, can be used as desired. For example, 20 or fewer symbols could be used to achieve a detection time of about 50-60 milliseconds or less (e.g., about 20×2.9 ms), and 8 or fewer symbols could be used to achieve a detection time of about 24 milliseconds or less (e.g., about 8×2.9 ms). Further, it is again noted that other numbers of symbols for the detection period could also be utilized, if desired, while still taking advantage of the techniques described herein. Other variations could also be utilized, as desired.

The following represents example pseudo code for an embodiment of the negative peak detection technique described with respect to FIGS. 5A-B. Other pseudo code algorithms could also be utilized as desired.

```
complex * hd_signal; // pointer to BBIQ data
int histogram[K];
while(1)
{
  for( symbol=0; symbol<N; symbol++) {
    usb = bandpass_usb(hd_signal);
    lsb = bandpass_lsb(hd_signal);
    hd_signal += 2160;
    usb_index = FINDMIN(usb)
    lsb_index = FINDMIN(lsb);
    histogram[usb_index]++;
    histogram[lsb_index]++;
  }
  [max_val, index_of_max_val] = max(histogram);
  hd_signal_detected = (max_val;> detection_threshold) ? 1 : 0;
  for(i=0;i<K;i++) histogram[i] = 0;
}
```

FIG. 6 a block diagram of an example embodiment 600 that compares index values associated with peak count values within the N-symbol histograms described with respect to FIG. 5B to detect the presence of HD content within received signals. In particular, the embodiment 600 utilizes the minimum detection blocks (FINDMIN) 500A/500B and the N-symbol histograms 554A/554B described with respect to of FIG. 5B to determine peak count values within the N-symbol histograms, and then compares index values associated with these peak count values to make the HD content determination. As with embodiment 550 in FIG. 5B, embodiment 600 receives the digital I/Q samples 209 and includes processing paths for the upper and lower sidebands. As also with embodiment 550, the upper sideband processing path for embodiment 600 includes the upper sideband BPF 242, minimum detection block (FINDMIN) 500A, and N-symbol histogram block 554A. The lower sideband processing path for embodiment 600 includes the lower sideband BPF 244, minimum detection block (FINDMIN) 500B, and N-symbol histogram block 554B. However, rather than simply using an N-symbol histogram to identify peak count values within the histogram, as is done for the embodiment 550 in FIG. 5B, the embodiment 600 of FIG. 6 compares index values associated with these peak count values to make the HD detection determination using compare block 610, and these comparison can be made over time using delay blocks, as described in more detail below.

As shown in FIG. 6, the N-symbol histogram 554A for the upper sideband is provided to detection block 602A, which finds the index value for the peak count value within the N-symbol histogram 554A. Peak index value 604A represents a current peak index value for the upper sideband that is provided to compare block 610. For the embodiment depicted, delay block ($z^{-1}$) 606A is used to provide a previous peak index value 608B to compare block 610, as well. Similarly, the N-symbol histogram 554B for the lower sideband is provided to detection block 602B, which finds the index value associated with the peak count value within the N-symbol histogram 554B. Peak index value 604B represents a current peak index value for the lower sideband that is provided to compare block 610. For the embodiment depicted, delay block ($z^{-1}$) 606B is used to provide a previous peak index value 608B to compare block 610, as well. The compare block 610 compares the peak index values 604A, 608A, 604B, and 608B from the upper and lower sidebands to determine if HD content has been detected.

In particular, for embodiment 600, it is assumed that if HD digital content is present in the received signal, peak index values will match for successive N-symbol histograms. The output signal 612 from compare block 610 represents this determination of whether or not peak index values match. The output signal 612 and can be, for example, a binary decision that indicates that HD content has been detected or that HD content has not been detected. It is noted that fewer or additional delay blocks and associated index values could be used if desired. For example, additional delay blocks could be utilized in addition to delay blocks 606A and 606B to increase the number of indices used for the detection comparison, if desired. Further, only one sideband could be used, such that for example, only the peak index values from one sideband (e.g., only index values 604A/608A or only index values 604B/608B) is used for the detection comparison. Still further, the delay blocks 606A and 606B could be removed, if desired. For this latter embodiment, only the current peak index values 604A and 604B would be compared between the upper and lower sidebands by compare block 610 to determine if HD content was present. Again, a match is deemed to indicate that HD content is present, and no match is deemed to indicated that HD content is not present. Other variations could also be implemented as desired.

For embodiment 600, therefore, the N-symbol histograms 554A and 554B are independently formed for each sideband, and the detection blocks 602A and 602B determine the index values for the peak count values within these histograms. In particular, an N-symbol histogram 554A for the upper sideband is constructed using the index output values 526A from the minimum detection block (FINDMIN) 500A, and an N-symbol histogram 554B for the lower sideband is constructed using the index output values 526B from the minimum detection block (FINDMIN) 500B. The index for the peak count value in the upper sideband histogram 554A is determined in block 602A, and the index for the peak count value in the lower sideband histogram 554B is determined in block 602B. The index sequences 604A and 604B are then delayed by one histogram sample, which is equivalent to a time delay of N symbols, by delay blocks 606A and 606B. Four values, therefore, are provided to compare block 610 in embodiment 600. These values are current on-time indices 604A/604B and delayed previous indices 608A/608B for the peak count values within the histograms 554A/554B for the upper and lower sidebands. The compare block 610 then compares the peak index values for the sidebands. As indicated above, this peak index comparison technique assumes that that peak index values will be the same for each sideband, and from symbol-to-symbol in time, if an HD signal is present in the received signal. Thus, if the indices are equal, HD content is deemed to be present within the received signal. If the indices are not equal, HD content is deemed not to be present in the received signal. It is noted that if one sideband is lost due to interference, for example, this peak index comparison technique can still perform a comparison of symbol-to-symbol in time using the sideband that is not lost.

It is also noted that a voting technique could also be utilized with respect to embodiment 600 where only a subset of the total number of available indices must match for HD content to be deemed detected. For example, where four indices are available, such as with the example embodiment 600, HD content could be deemed to have been detected if less than all the four indices match (e.g., at least three indices match). Other subset numbers could be utilized, as desired, depending upon the number of available indices and the number selected for the number of indices that must match before HD content is deemed present. Other variations could be implemented, as desired.

The following represents example pseudo code for an embodiment of the peak index comparison technique described with respect to FIG. 6. Other pseudo code algorithms could also be utilized as desired.

```
complex * hd_signal; // pointer to BBIQ data
int usb_histogram[K], lsb_histogram[K];
while(1)
{
   for( symbol=0; symbol<N; symbol++) {
       usb = bandpass_usb(hd_signal);
       lsb = bandpass_lsb(hd_signal);
       hd_signal += 2160;
       usb_index = FINDMIN(usb);
       lsb_index = FINDMIN(lsb);
       usb_histogram[usb_index]++;
       lsb_histogram[lsb_index]++;
   }
   prev_index1 = index1; prev_index2 = index2;
   [max_val1, index1] = max(histogram_usb);
   [lmax_val2, index2] = max(histogram_lsb);
   for(i=0;i<K;i++) {
       usb_histogram[i] = 0; lsb_histogram[i] = 0;
   }
   If ((index1==index2)&&
   (prev_index1==index1\\prev_index2_index1)) ||
     ((prev_index1==prev_index2)&&
     (index1==prev_index1\\index2==prev_index1))
           hd_detected = 1; else hd_detected = 0;
}
```

For the embodiment described with respect to FIG. 6, therefore, current peak index values and previous peak index values for N-symbol histograms are compared against each other to make a determination of whether HD content is present. Advantageously, as with embodiments of FIGS. 5A-B above, this determination of whether HD digital content is present can be made using a selected number of symbols for the N-symbol histograms and a selected number of delay blocks. Further, a selected number of delay blocks could be utilized. For example, if 8 symbols were used for the N-symbol histograms and a single delay block were used, then a total of 16 symbol times would be used to generate the current peak index values 604A/604B and the previous peak index values 608A/608B. These 16 symbol times would lead to a detection period of about 46 milliseconds (e.g., 16×2.9 ms). As indicated above, different numbers of symbols and delay blocks, as well as other variations, could be implemented as desired. For example, 10 or fewer symbols and 1 delay block could be used to achieve a detection time of about 50-60 milliseconds or less (e.g., about 10×2×2.9 ms), and 4 or fewer symbols and 1 delay block could be used to achieve a detection time of about 24 milliseconds or less (e.g., about 4×2×2.9 ms). Other variations could also be utilized, as desired.

FIG. 7A is a block diagram of an example embodiment 700 that determines a ratio associated with magnitude values from a sliding window averaging filter applied to received signals. In particular, embodiment 700 utilizes the embodiment for sliding window averaging filter circuitry 302 depicted in FIG. 5A to produce subsampled sliding window output sequence (y(k)) 512. Embodiment 700 then utilizes a ratio associated with these values to make the HD content comparison within the HD shape detection circuitry 304. For example, as described below, a ratio of average magnitude values to negative peak magnitude values can be used to make the HD content determination. Other ratios and variations could be implemented, as desired.

As with embodiment 500 in FIG. 5A, sliding window averaging filter circuitry 302 includes subsampler (subsample by L) 506, sliding widow average block 508, and subsampler (subsample by M) 510. Also as with embodiment 500 in FIG. 5A, complex magnitude detector 301 provides complex magnitude values to sliding window averaging filter circuitry 302, which in turn provides subsampled sliding window output sequence (y(k)) 512 to HD shape detection circuitry 304. However, unlike embodiment 500 in FIG. 5A, the HD shape detection circuitry 304 for embodiment 700 includes demultiplexer block (DEMUX) 702 and ratio determination block 710, as well as accumulator blocks 704, 706 ... 708. In particular, the demultiplexer (DEMUX) 702 operates to separate the sliding window sequence (y(k)) 512 into K different accumulators 704, 706 ... 708. This demultiplexing (1-to-K) can be conducted, for example, using a modulo function, as described in more detail below. The accumulator output signals from the first accumulator (ACCUMULATE1) 704, the second accumulator (ACCUMULATE2) 706 to the Kth accumulator (ACCUMULATE (K)) are provided or dumped to the ratio determination block 710 every N symbols. The ratio determination block 710 operates to determine a ratio 712 relating to the accumulated values. For example, ratio determination block 710 can determine a ratio of the minimum value in accumulator blocks 704, 706 ... 708 to the average value of the accumulated values in accumulator blocks 704, 706 ... 708 for each N-symbol dump of the accumulated values. This ratio 712 can then be used for HD detection determinations.

FIG. 7B is a block diagram of an example embodiment 750 that utilizes ratios from the accumulate-and-dump ratio determination blocks (ACCDUMP) 700A and 700B to detect the presence of HD content within the received signals. The accumulate-and-dump ratio determination blocks (ACCDUMP) 700A and 700B are each implemented as shown for embodiment 700 in FIG. 7A. As with FIG. 5A, the digital I/Q samples 209 are provided to the upper sideband BPF 242 and the lower sideband BPF 244. The upper sideband BPF 242 again isolates the frequency range for the upper HD Radio sideband for the selected channel and provides filtered digital I/Q samples 252 at the sampling rate ($f_S$) to the ratio determination block (ACCDUMP) 700A. The ratio 712A from block (ACCDUMP) 700A is provided every N symbols ($f_{SYM}/N$) to summation block 752. Similarly, the lower sideband BPF 244 isolates the frequency range for the lower HD Radio sideband for the selected channel and provides filtered digital I/Q samples 254 at the sampling rate ($f_S$) to the ratio determination block (ACCDUMP) 700B. The ratio 712B from block (ACCDUMP) 700B is provided every N symbols ($f_{SYM}/N$) to summation block 752. Summation block 752 combines the ratio value 712A for the upper sideband and the ratio value 712B for the lower sideband and generates a combined detection ratio 754. This detection ratio 754 is used as an indication of whether or not HD content exists within the received signal. For example, if min-to-average ratios are used for ratios 712A and 712B, combined detection ratio 754 can be used to discriminate between noise-only signals and signals that include HD content by comparing the combined min-to-average detection ratio 754 against a threshold ratio. For min-to-average ratios, it is assumed that received signals with HD content will produce a lower min-to-average ratio than will signals without HD content. As one example, a minimum value to average value (min-to-average) ratio of 1-to-2 could be utilized, and a detected min-to-average ratio of 1-to-2 or below would indicate that HD content was present within the received signals. Other ratios and/or threshold values could also be utilized, and variations could be implemented, as desired.

For embodiment 750, therefore, a number of processing steps are performed on the upper and lower sidebands to correlate the sliding window output sequence (y(k)) 512 with itself over multiple symbols and then to determine the average-to-min ratio for this correlation. Although, it is again noted that these steps could be performed on only one sideband, if desired. First, the subsampled sequence (y(k)) 512 is produced for each sideband within the ratio determination blocks (ACCDUMP) 700A and 700B, as shown in FIG. 7A for embodiment 700. Next, this sliding window sequence (y(k)) 512 is demultiplexed by 1-to-K demultiplexer (DEMUX) 702 into K accumulators 704, 706 . . . 708 using a modulo operation. For example, the following demultiplexing pseudo code operation can be applied:

$$\text{acc}[k \%KJ+=y(k), \text{ where } \% \text{ represents the modulo operator} \quad \text{[EQUATION 3]}$$

For EQUATION 3, K can be selected to be 60 so as to match the number of samples per symbol provided by sliding window averaging filter circuitry 302, although other numbers could be selected, if desired. Every N symbols (e.g., N=16), the accumulated values stored in accumulators 704, 706 . . . 708 are dumped to ratio determination block 710. Ratio determination block 710 then operates to determine a ratio value, such as a ratio of the minimum value in the accumulators 704, 706 . . . 708 to an average value with the accumulators 704, 706 . . . 708. The ratio determination block 710 can then clear the accumulators 704, 706 . . . 708 to start the next N-symbol accumulation.

For the ratio determination, the ratios 712A and 712B from the upper and lower sideband paths are combined in summation block 752 to form detection ratio 754. The detection ratio 754 is then compared to a threshold value to make the determination of whether or not an HD signal has been detected. For example, if the detection ratio 754 is equal to or below a selected threshold value, an HD signal is deemed to have been detected. Conversely, if the detection ratio is above the selected threshold value, an HD signal is deemed not to have been detected. As indicated above, as one example, a minimum value to average value (min-to-average) ratio of 1-to-2 could be utilized. Other ratios and/or threshold values could also be utilized, and variations could be implemented, as desired.

One variation to this ratio technique is to use a multiplication for the demultiplexing process instead of a summation accumulation. For example, the following demultiplexing pseudo code operation can be applied to provide a multiplication accumulation rather than a summation accumulation:

$$\text{acc}[k \%KJ*=y(k), \text{ where } \% \text{ represents the modulo operator} \quad \text{[EQUATION 4]}$$

For EQUATION 4, K can again be selected to be 60, although other numbers could be selected, if desired. Other demultiplexing operations could also be utilized, if desired, and variations could be implemented as desired while still utilizing the detection ratio techniques described herein.

For the embodiments described with respect to FIGS. 7A-B, therefore, ratios associated with accumulated demultiplexed values for sliding window subsampled OFDM symbols are compared to threshold ratios to make a determination of whether HD content is present. Advantageously, as with the embodiments of FIGS. 5A-B and 6 above, this determination of whether HD content is present can be made rapidly. For example, by accumulating values for 8 symbols before the dumping operation, a detection period of about 23 milliseconds (e.g., 8×2.9 ms) could be provided. As indicated above, different numbers of symbols, as well as other variations, could be implemented as desired. For example, 20 or fewer symbols could be accumulated prior to dumping to achieve a detection time of about 50-60 milliseconds or less (e.g., about 20×2.9 ms), and 8 or fewer symbols could be accumulated prior to dumping to achieve a detection time of about 24 milliseconds or less (e.g., about 8×2.9 ms). Other variations could also be utilized, as desired.

It is noted that the functional blocks and circuitry described herein can be implemented using hardware, software or a combination of hardware and software, as desired. In addition, one or more processors running software and/or firmware can also be used, as desired, to implement the disclosed embodiments. It is further understood that one or more of the tasks, functions, or methodologies described herein may be implemented, for example, as software or firmware and/or other instructions embodied in one or more non-transitory tangible computer readable mediums that are executed by a controller, microcontroller, processor, microprocessor, or other suitable processing circuitry.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. A receiver system for detecting digital content in a radio frequency (RF) channel, comprising:
    front-end circuitry configured to receive radio frequency (RF) signals and to output signals associated with a channel within the RF signals;
    analog-to-digital conversion (ADC) circuitry configured to receive the output signals and to output digital samples having a real component (I) and an imaginary component (Q);
    complex magnitude determination circuitry configured to receive the digital samples and to generate complex magnitudes for the digital samples;
    sliding window averaging filter circuitry configured to subsample the complex magnitudes for each of a plurality of symbols, to apply a sliding window average to the subsampled complex magnitudes to generate a plurality of averaged subsampled magnitude values for each symbol based upon subsampled complex magnitudes within sliding windows of subsampled complex magnitudes, and to output the averaged subsampled magnitude values for each symbol; and
    shape detection circuitry configured to determine if digital content is present within the channel having a digital content shaping function, the digital content shaping function being associated with digital content to be detected, the shape detection circuitry comprising:
        buffer circuitry configured to store the averaged subsampled magnitude values for each symbol, each averaged subsampled magnitude value having an associated index value; and
        detection circuitry configured to detect a minimum value within the stored averaged subsampled magnitude values for each symbol, to output an index value associated with the detected minimum value for each symbol, and to form an index count histogram based upon index values output for the plurality of symbols;
    wherein the index count histogram includes count values associated with the index values output for the plurality of symbols; and
    wherein the shape detection circuitry is further configured to use the count values within the index count histogram to determine if digital content is present within the channel having the digital content shaping function;
    wherein the digital content is included within OFDM (orthogonal frequency division multiplexed) symbols transmitted within the channel, and wherein the digital content shaping function comprises a pulse shaping function applied to each OFDM symbol.

2. The receiver system of claim 1, wherein the sliding window averaging filter circuitry comprises a first subsampler configured to receive the complex magnitudes and to output subsampled values, averaging filter circuitry configured to average a varying plurality of the subsampled values within a sliding window of subsampled values and to output averaged values, and a second subsampler configured to subsample the averaged values and to output the averaged subsampled magnitude values.

3. The receiver system of claim 1, wherein the shape detection circuitry is further configured to determine a peak count value within the index count histogram and to compare the peak count value to a threshold value to determine if digital content is present within the channel having the pulse shaping function for the OFDM symbols.

4. The receiver system of claim 1, wherein the sliding window averaging filter circuitry and the shape detection circuitry are configured to independently process two sidebands within the channel to generate first and second index count histograms, and wherein the shape detection circuitry is further configured to combine the first and second index count histograms to generate a combined index count histogram, to determine a peak count value within the combined index count histogram, and to compare the peak count value to a threshold value to determine if digital content is present within the channel having the pulse shaping function for the OFDM symbols.

5. The receiver system of claim 1, wherein the shape detection circuitry is further configured to determine an index value associated with a peak count value within the index count histogram and to compare multiple index values over time to determine if digital content is present within the channel having the pulse shaping function for the OFDM symbols.

6. The receiver system of claim 1, wherein the sliding window averaging filter circuitry and the shape detection circuitry are configured to independently process two sidebands within the channel to generate first and second index values and to compare multiple first and second index values over time to determine if digital content is present within the channel having the pulse shaping function for the OFDM symbols.

7. The receiver system of claim 1, further comprising control circuitry configured to output a detection signal indicating whether or not digital content is determined to be present.

8. The receiver system of claim 7, wherein the digital content comprises HD (High Definition) Radio digital content included within OFDM signals transmitted within the channel.

9. The receiver system of claim 8, wherein the OFDM signals for the HD Radio digital content is transmitted within the channel without associated analog content or is transmitted within the channel within one or more sidebands associated with a center frequency for analog content also transmitted within the channel.

10. The receiver system of claim 8, further comprising HD demodulator circuitry configured to demodulate HD Radio digital content, and wherein the HD demodulator circuitry is configured to be powered or not powered depending upon whether or not the detection signal indicates that digital content is present within the channel.

11. The receiver system of claim 1, wherein a detection time to determine if digital content is present within the channel is 50 or less milliseconds.

12. The receiver system of claim 1, wherein the plurality of symbols is 20 or fewer symbols.

13. A receiver system for detecting digital content in a radio frequency (RF) channel, comprising:
    front-end circuitry configured to receive radio frequency (RF) signals and to output signals associated with a channel within the RF signals;
    analog-to-digital conversion (ADC) circuitry configured to receive the output signals and to output digital samples having a real component (I) and an imaginary component (Q);

complex magnitude determination circuitry configured to receive the digital samples and to generate complex magnitudes for the digital samples;
sliding window averaging filter circuitry configured to subsample the complex magnitudes for each of a plurality of symbols, to apply a sliding window average to the subsampled complex magnitudes to generate averaged subsampled magnitude values for subsampled complex magnitudes within a sliding window of subsampled complex magnitudes for each symbol, and to output the averaged subsampled magnitude values for each symbol; and
shape detection circuitry configured to determine if digital content is present within the channel having a digital content shaping function, the digital content shaping function being associated with digital content to be detected, the shape detection circuitry comprising:
demultiplexer circuitry configured to demultiplex the averaged subsampled magnitude values into a plurality of demuxed subsamples for each symbol;
a plurality of accumulators configured to accumulate the demuxed subsamples for the plurality of symbols and to generate a plurality of accumulated values; and
ratio detection circuitry configured to determine a ratio associated with the plurality of accumulated values; and
wherein shape detection circuitry is further configured to compare the ratio to a threshold ratio to determine if digital content is present within the channel having the digital content shaping function;
wherein the digital content is included within OFDM (orthogonal frequency division multiplexed) symbols transmitted within the channel, and wherein the digital content shaping function comprises a pulse shaping function applied to each OFDM symbol.

14. The receiver system of claim 13, wherein the sliding window averaging filter circuitry and the shape detection circuitry are configured to independently process two sidebands within the channel to generate first and a second ratios and to combine the first and second ratios into a combined ratio, and wherein the shape detection circuitry is further configured to compare the combined ratio to the threshold ratio to determine if digital content is present within the channel having the pulse shaping function for the OFDM symbols.

15. The receiver system of claim 14, wherein the ratio comprises a ratio of a minimum accumulated value to an average of the plurality of accumulated values within the accumulators.

16. The receiver system of claim 13, wherein the plurality of symbols is 20 or fewer symbols.

17. The receiver system of claim 13, wherein a detection time to determine if digital content is present within the channel is 50 or less milliseconds.

18. A method for detecting digital content in a radio frequency (RF) channel, comprising:
receiving radio frequency (RF) signals;
digitizing signals associated with a channel within the RF signals to generate digital samples having a real component (I) and an imaginary component (Q);
determining complex magnitudes for the digital samples;
applying a sliding window averaging filter to subsample the complex magnitudes for each of a plurality of symbols, to apply a sliding window average to the subsampled complex magnitudes to generate a plurality of averaged subsampled magnitude values for each symbol based upon subsampled complex magnitudes within sliding windows of subsampled complex magnitudes, and to output the averaged subsampled magnitude values for each symbol;
determining if digital content is present within the channel having a digital content shaping function, the digital content shaping function being associated with digital content to be detected, the determining further comprising:
storing the averaged subsampled magnitude values for each symbol, each magnitude value having an associated index value;
determining a minimum value within the stored averaged subsampled magnitude values for each symbol,
outputting an index value associated with the detected minimum value for each symbol; and
forming an index count histogram based upon index values output for the plurality of symbols, the index count histogram including count values associated with the index values output for the plurality of symbols; and
using the count values within the index count histogram to determine if digital content is present within the channel having the digital content shaping function; and
outputting a detection signal indicating whether or not digital content is present;
wherein the digital content is included within OFDM (orthogonal frequency division multiplexed) symbols transmitted within the channel, and wherein the digital content shaping function comprises a pulse shaping function applied to each OFDM symbol.

19. The method of claim 18, further comprising determining a peak count value within the index count histogram and comparing the peak count value to a threshold value to determine if digital content is present within the channel having the pulse shaping function for the OFDM symbols.

20. The method of claim 18, further comprising independently processing two sidebands within the channel to generate first and second index count histograms, combining the first and second index count histograms to generate a combined index count histogram, determining a peak count value within the combined index count histogram, and comparing the peak count value to a threshold value to determine if digital content is present within the channel having the pulse shaping function for the OFDM symbols.

21. The method of claim 18, further comprising determining an index value associated with a peak count value within the index count histogram and comparing multiple index values over time to determine if digital content is present within the channel having the pulse shaping function for the OFDM symbols.

22. The method of claim 18, further comprising independently processing two sidebands within the channel to generate first and second index values and comparing multiple first and second index values over time to determine if digital content is present within the channel having the pulse shaping function for the OFDM symbols.

23. The method of claim 18, wherein the digital content comprises HD (High Definition) Radio digital content included within OFDM signals transmitted within the channel.

24. The method of claim 23, wherein the OFDM signals for the HD Radio digital content is transmitted within the channel without associated analog content or is transmitted within the channel within one or more sidebands associated with a center frequency for analog content also transmitted within the channel.

25. The method of claim 23, further comprising controlling whether or not an HD demodulator is powered based upon whether or not the detection signal indicates that digital content is present within the channel.

26. The method of claim 23, further comprising determining whether digital content is present for a plurality of channels within the RF signals and storing for each channel an indication of whether digital content is present or is not present within the channel.

27. The method of claim 18, wherein a detection time to determine if digital content is present within the channel is 50 or less milliseconds.

28. The method of claim 18, wherein the plurality of symbols is 20 or fewer symbols.

29. A method for detecting digital content in a radio frequency (RF) channel, comprising:
  receiving radio frequency (RF) signals;
  digitizing signals associated with a channel within the RF signals to generate digital samples having a real component (I) and an imaginary component (Q);
  determining complex magnitudes for the digital samples;
  applying a sliding window averaging filter to subsample the complex magnitudes for each of a plurality of symbols, to generate averaged subsampled magnitude values for subsampled complex magnitudes within a sliding window of subsampled complex magnitudes for each symbol, and to output the averaged subsampled magnitude values for each symbol;
  determining if digital content is present within the channel having a digital content shaping function, the digital content shaping function being associated with digital content to be detected, the determining further comprising:
    demultiplexing the averaged subsampled magnitude values into a plurality of demuxed subsamples for each symbol;
    accumulating each of the demuxed subsamples for the plurality of symbols to generate a plurality of accumulated values;
    determining a ratio associated with the plurality of accumulated values; and
    comparing the ratio to a threshold ratio to determine if digital content is present within the channel having the digital content shaping function; and
  outputting a detection signal indicating whether or not digital content is present;
  wherein the digital content is included within OFDM (orthogonal frequency division multiplexed) symbols transmitted within the channel, and wherein the digital content shaping function comprises a pulse shaping function applied to each OFDM symbol.

30. The method of claim 29, further comprising independently processing two sidebands within the channel to generate first and a second ratios, combining the first and second ratios into a combined ratio, and comparing the combined ratio to the threshold ratio to determine if digital content is present within the channel having the pulse shaping function for the OFDM symbols.

31. The method of claim 29, wherein the plurality of symbols is 20 or fewer symbols.

32. The method of claim 29, wherein a detection time to determine if digital content is present within the channel is 50 or less milliseconds.

* * * * *